2,675,737

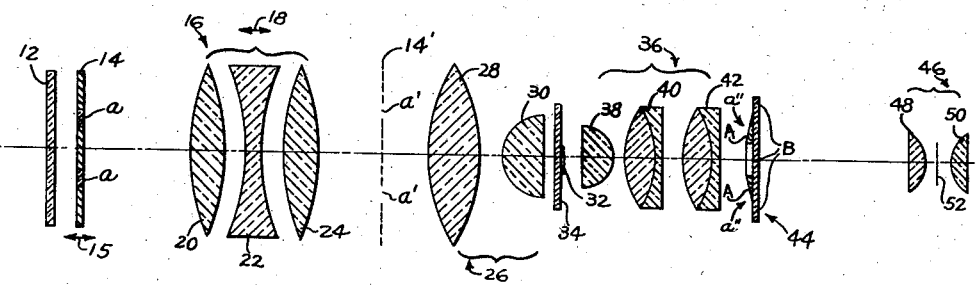
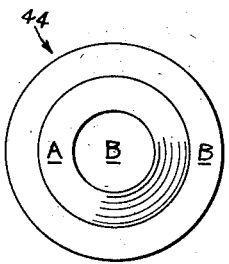 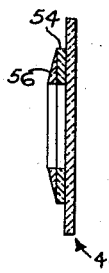 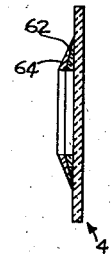 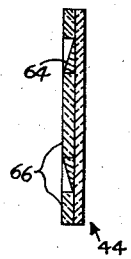 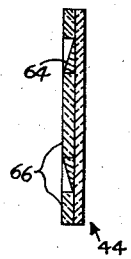
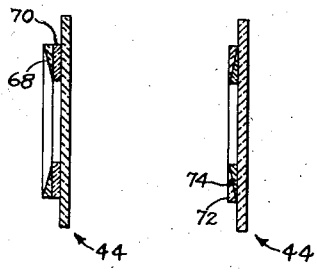 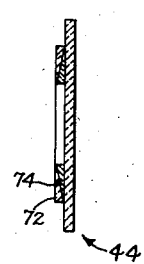 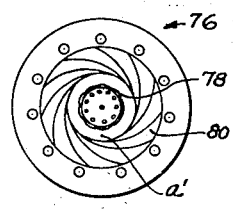 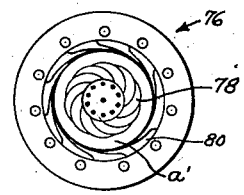
INVENTOR.
ALVA H. BENNETT
ATTORNEYS Patented Apr. 20, 1954

UNITED STATES PATENT OFFICE 2,675,737

MICROSCOPE WITH VARIABLE MEANS FOR GRADUALLY ALTERING THE CONTRAST IN OPTICAL IMAGES

Alva H. Bennett, Kenmore, N. Y., assignor to American Optical Company, Southbridge, Mass., a voluntary association of Massachusetts Application February 15, 1949, Serial No. 76,466

4 Claims. (Cl. 88—39)

This invention relates to modification of light rays, which are incident and which emanate from an object under observation, to obtain gradual alteration of contrast effects in the visible image of the object. More particularly, the invention relates to means for the purpose which may be employed in the optical system of a microscope for gradually varying contrast effects in the image of a specimen, especially when regions of the specimen have differences of optical path and light transmission which are ordinarily not clearly perceptible.

In the field of what may be termed "phase contrast microscopy," various methods and devices are known for improving contrast in the image of a specimen of the aforesaid type. In general, an illuminating beam is admitted to a substage condenser through an aperture formed in a diaphragm and is directed upon the specimen, the diaphragm being mounted at or near the first focal plane of the condenser. A disc or plate, having portions related in contour to the diaphragm aperture, for selectively modifying the phase or amplitude, or both, of diffracted or deviated light rays and undeviated light rays emanating from the specimen is mounted at or near the back focal plane of an objective as established in conjunction with the condenser. The image of the specimen is formed at the field of an eyepiece where interference of the deviated and undeviated rays occurs to provide certain contrast effects.

A specimen of the type considered herein may constitute a plurality of particles and surrounding regions, a given particle and the surround associated therewith having, for example, a small difference in optical path (thickness times refractive index) or a small transmission difference. For clarity of explanation, a single particle and its surround and the relation of light rays thereto will be considered. Certain of the light rays emanating from the particle are deviated (diffracted) thereby while others pass through the particle substantially undeviated. Undeviated light rays also emerge from the surround. Assuming a suitable primary or secondary light source, a condenser and an objective, the undeviated rays emanating both from the particle and the surround are spread throughout a visible image plane such as the field of an eyepiece. The deviated spectra emanating from the particle are brought to a focus on a part of the eyepiece field and are combined with overlapping portions of the undeviated rays to form a geometrical image of the particle. In passing through the particle; phase and/or amplitude differences occur between the deviated and undeviated light rays. During their passage through the modifying disc or plate, selective phase and/or amplitude modification of one or both of the deviated and undeviated rays may be performed so that the combined or interfering rays forming the image of the particle reinforce or destroy one another according to their phase relationship or are selectively affected in amplitude to provide bright or dark contrast of the particle relative to the surround, which is represented by substantially undeviated noninterfering rays.

The term "light," as used herein, is not necessarily restricted to those wave lengths of radiant energy to which the human eye is sensitive but may comprise other forms of radiant energy including those in the invisible portions of the spectrum. Any suitable primary or secondary light source may be employed in the optical system, a secondary source constituted by a diaphragm having an aperture of predetermined dimensions and contour being shown herein as a preferred embodiment. Other light sources or means serving as "effective" light sources may be employed such as an incandescent filament, a fluorescent tube, a reflecting surface, the image of a lamp filament, the image of an aperture or the image of some other source of radiant energy. A preferred position for the light source is adjacent the front focal plane of the condenser.

An object of the present invention is to provide an optical system capable of gradually altering contrast effects in the visible image of an object or specimen so that the structure of the specimen may be more clearly apparent.

Another object of the invention is to provide a device for use in the optical system of a microscope which enables variation of the phase relation between deviated and undeviated light rays emanating from a specimen in a gradual manner.

A further object of the invention is to provide a device of the character described which enables a gradual alteration of the amplitude ratio between the deviated and undeviated light rays.

Still another object of the invention is to provide a device or system of the above-mentioned type which is of relatively simple construction and which possesses the advantage of ease of operation and freedom from dislocation of adjustment.

These and other objects of the invention will be apparent from the following description taken in connection with the accompanying drawings, wherein like reference characters refer to like parts throughout the several views and of which drawings:

Figure 1 is a diagrammatic view of an optical system incorporating an embodiment of the invention;

Fig. 2 is a front detail view of a component suitable for use in the optical system of Fig. 1;

Fig. 3 is a cross-sectional view of the component shown in Fig. 2;

Fig. 4 is a cross-sectional view of another component adapted to be used in the optical system of Fig. 1;

Fig. 5 is a cross-sectional view of another component for use in the system of Fig. 1;

Fig. 6 is a cross-sectional view of another component adapted to be used in the system of Fig. 1;

Fig. 7 is a similar view of still another component for use in the system of Fig. 1;

Fig. 8 illustrates in cross-section another component suitable for employement in the system of Fig. 1;

Fig. 9 is a front detail view of a modification of the light source and associated means of Fig. 1; and Fig. 10 is a similar view of the means of Fig. 9 illustrating a second operational position thereof.

Referring to the optical system illustrated in Fig. 1, a light diffusing screen 12, which may be formed of opal glass or the like is mounted adjacent an entrance pupil of the system. A diaphragm 14 is positioned contiguous screen 12 and is centered with respect to the optical axis of the system, represented by the horizontal broken line, the diaphragm having a light aperture $a$, of predetermined dimensions and contour. Diffused light rays from screen 12 are incident diaphragm 14 and emerge from aperture $a$ to provide a secondary light source in the form of an annulus, in the example shown. A lens system 16 comprising, for example, elements 20, 22 and 24 is positioned adjacent diaphragm 14 for the purpose of effectively positioning diaphragm 14 at a plane 14' predeterminedly intersecting the optical axis. Accordingly, a real image $a'$ of the light aperture $a$ is formed at image plane 14' and may be considered as an effective light source at said position. A substage condenser 26 includes elements 28 and 30. The aforesaid image plane 14' is located adjacent the front focal plane of condenser 26. Light rays from $a'$ are directed by condenser 26 upon a specimen 32 mounted upon a slide 34. An objective 36, appropriately including a strong positive lens 38 and two doublets 40 and 42, is mounted to the side of slide 34.

A plate-like element 44, for selectively modifying the deviated and undeviated light rays which emanate from specimen 32 and which are directed upon predetermined portions of said plate 44 by the coacting condenser and objective lens systems 26 and 36, is positioned adjacent the back focal plane of objective 36. An eyepiece 46, suitably comprising elements 48 and 50 and having an image plane 52 completes the optical system of Fig. 1. Diffusing means 12 may be dispensed with provided a suitable light source for distributing light throughout aperture $a$ is employed.

Plate element 44, coacting with other components of the system, is of a type for selectively and gradually modifying a wave characteristic, namely, the phase or amplitude of the undeviated light rays emanating from the specimen. In addition, and as will presently be described in conjunction with Figs. 3 through 8, plate element 44 may provide alteration of both phase and amplitude of the undeviated light rays. As hereinbefore described, alteration of the phase difference between the deviated or undeviated spectra emanating from a particle may be employed to provide reinforcing or destructive interference of the overlapping portions of said spectra which form the visible image of the particle at image plane 46. Accordingly, a resultant amplitude of the overlapping image-forming spectra is effected where by the particle is represented, respectively, in bright or dark contrast relative to the surround. Alteration of the amplitude of the deviated or undeviated spectra may be employed for obtaining other contrast effects between the particle and the surround.

Constructions of the apparatus permitting the foregoing selective and gradually variable control of spectra are as follows. Plate-like element 44, which is generally represented in Figs. 1 and 2 with A indicating a conjugate zone for intercepting undeviated spectra and B representing a complementary zone for intercepting deviated spectra, consists of a disc of optical grade glass. Various light-retarding and/or light-absorbing materials of predetermined contour and form are bonded to or deposited upon one or more surfaces of the disc. For example, as shown in Fig. 3, the disc has deposited thereon in the conjugate zone an annular ring 54 consisting of a thin layer of metallic material of constant thickness, such as aluminum, plutonium, rhodium, or the like, for partially absorbing the undeviated spectra. An annular, wedge-like ring 56 formed of a suitable light-retarding material, which may be in the form of a dielectric such as magnesium fluoride or quartz, is superposed on ring 54. Or, ring 54 may be superposed on ring 56, externally thereof, if preferred. Ring 56 varies in physical thickness in a direction radially from the center of the disc to form an optical wedge having gradually varying retardation properties according to differences in its thickness as, for example, from 0λ to plus or minus .5λ. As hereinbefore stated, lens system 16 forms a real image of aperture $a$ at $a'$. In turn, lens systems 26 and 36 form a real image of the image $a'$ at conjugate zone A of disc 44.

To provide variable magnification of the image of $a$ at $a'$, the spacing along the optical axis between diaphragm 14 and lens system 16, and thus between said components and image plane 14', is rendered variable, as indicated by double-headed arrows 15 and 18, by suitable means (not shown) for gradually moving the elements 14 and 16 longitudinally of the optical axis. Said imaging of $a$ at $a'$ with variable magnification is achieved in accordance with the formulas:

$$d = \frac{1-M}{M} f$$

$$d' = (1-M)f$$

where $d$ is the object distance of diaphragm 14 from the plane of the first component 20 of lens system 16, and where $d'$ is the image distance of image plane 14' from the plane of component 24 of lens system 16. M is the magnification of the image $a'$ with respect to $a$, and $f$ is the equivalent focal length of lens system 16. The distances $d$ and $d'$ can be established in their proper magnitudes either by an interlocking mechanism between diaphragm 14 and the mounting for lens system 16 so that each moves the correct distance, while image plane 14' remains fixed, or by individually adjustable mountings for diaphragm 14 and lens system 16 with respect to a fixed position of image plane 14'.

By performing the aforesaid adjustment of components 14 and 16 and thus varying the magnification of the annular image a', gradual variation of the diameter of the annular image a'' at disc 44 is obtained. Accordingly, the annular image a'' can be made to gradually contract or expand radially and is thus caused to be incident different radial portions of the conjugate zone of element 44. It will be understood that the width of image a'' is narrower than the radial width of conjugate zone 44. Assuming element 44 to comprise an annular metallic ring 54 of constant thickness and an annular dielectric wedge 56 (Fig. 3), absorption and, accordingly, amplitude change of the undeviated spectra remains constant throughout radial movement of the image a''. However, because of the radial difference in thickness of dielectric ring 56, retardation of the undeviated spectra can be gradually varied throughout a predetermined range as, for example, through 0λ to plus or minus .5λ by expanding or contracting the annular image a'' so that it is incident different thicknesses of said ring 56.

While it will be apparent that radially of the image a'' of the undeviated spectra there will be a small difference in retardation because of the radial difference in thickness of wedge 56, if the optical path gradients are small and the width of the annular image is narrow this difference can be kept within satisfactory limits. A small portion of the deviated spectra, principally incident the complementary zone B, will also be incident the conjugate zone A and will be affected by the retardation and absorption properties of the latter but if zone A is sufficiently narrow with respect to the entire light transmitting area of disc 44, a very small portion of the deviated light will be so affected.

As shown in Fig. 4, the annular-light-retarding ring 58 may be of a constant thickness and the light-absorbing ring 60 may constitute a radially-tapered wedge. Thus the undeviated spectra may be gradually varied in amplitude and undergo a constant retardation of phase while the image a'' is being expanded or contracted. The metallic wedge 60 may be formed to permit light absorption varying from 100% to zero. Where light-absorbing and light-retarding wedges are shown, it will be apparent that the thicker portions of the wedges provide a greater absorption or retardation than the thinner portions. The various wedges and the layers of constant thickness are shown in somewhat exaggerated dimension in the drawings.

In Fig. 5, both the light-absorbing ring 62 and the light-retarding ring 64 are shown as wedge-shaped, enabling a gradual variation of both the phase and amplitude of the incident spectra, both the retardation and absorption of the light rays increasing as the image a'' is contracted.

Fig. 6 illustrates a construction wherein wedge 64 in the conjugate zone is formed of either a light-retarding or a light-absorbing material, and layer 66, superposed with the complementary zone, is formed of either of said materials which is not employed in the conjugate zone.

In Fig. 7, a wedge 68, which may be formed of either a light-retarding or a light-absorbing material, is shown tapering in a direction opposite to that of previous examples. The layer 70 is formed of either of said light-modifying materials which is not employed in wedge 68.

Fig. 8 illustrates a light-modifying element wherein a wedge 72 of light-absorbing material and a wedge 74 of light-retarding material are superposed, the former tapering radially inwardly and the latter tapering radially outwardly. Accordingly, expansion of annular image a'' provides a gradual increase in absorption (decreases in amplitude), of the undeviated light rays and, simultaneously, a gradual decrease in retardation thereof. Contraction of image a'' produces the opposite effect.

Figs. 9 and 10 illustrate a device which may be substituted for components 14 and 16 of Fig. 1, namely, a composite iris diaphragm 76 which may be positioned at image plane 14' of Fig. 1. Through radial contraction of the light aperture a' (Fig. 9) and radial expansion of said aperture (Fig. 10), as obtained by coacting leaves 78 and 80, the annular image a'' (Fig. 1) is moved radially across portions of the conjugate zone A of element 44 and gradual modification of phase and amplitude of the undeviated light rays is obtained in the manner above described.

It is to be understood that various other modifications of the constructions and relative positioning of components may be made in accordance with the general principles exemplified herein. For example, a series of interchangeable plates having suitable zonal coatings of constant thickness and proper dimensions and contour for selectively retarding and/or absorbing the deviated and undeviated light rays throughout a predetermined range may be employed in conjugation with wedge-carrying plates of the type described herein. Said interchangeable plates would be inserted contiguous the wedge-carrying plates, in superposed relation therewith, and would enable step-wise modification of the light rays transmitted by either the conjugate or complementary zones, or both, in conjunction with the gradual modification of light rays passing through the conjugate zone, as permitted by the wedges. Where gradual modification of the phase of the undeviated light rays is obtained by the wedge means described herein, independent gradual modification of the relative amplitude of the light rays passing through the conjugate and complementary zones could be obtained by superposing an individual area of light polarizing material upon each of the zones of plate 44, the direction of polarization of each area being angularly disposed relative to the other as, for example, at 90°, and by employing an analyzer therewith. Any suitable means may be employed for moving the undeviated light rays over different portions of the conjugate zone for the purpose set forth and, while but two examples of such means have been described herein, the invention is not necessarily limited thereto. Accordingly, such examples as are generally described herein are merely illustrative and the invention may be otherwise embodied and practiced within the scope of the following claims.

I claim:

1. A progressively variable phase contrast optical system for examining objects of relatively low contrast, said system comprising a condenser and an objective in optical alignment along a common optical axis and in predetermined spaced relation to each other, said condenser and objective jointly forming a combined lens system having a front focal plane and a rear focal plane conjugate thereto, variable light-modifying means for gradually altering in an uninterrupted progressively variable manner contrast effects in the image of an object when positioned at a predetermined object plane of said objective and illuminated by light transmitted by said condenser, said light-modifying means comprising light aperture means aligned with said combined lens system and positioned at a predetermined location forwardly of said condenser for receiving light from a light source and directing said light into said optical system, said light aperture means providing a light annulus substantially concentric with said axis and of predetermined size and contour substantially at said front focal plane, said combined lens system providing a concentric image of said light annulus at said rear focal plane, said light-modifying means also comprising parallel sided plate-like light-transmitting means optically aligned with said combined lens system and positioned adjacent said rear focal plane, said plate-like means comprising a plurality of areas one of which is generally geometrically similar in contour to the contour of said light annulus at said front focal plane and to the image thereof at said rear focal plane, said plate-like means intercepting the deviated and undeviated light rays emanating from the object positioned at said predetermined object plane and transmitted by said objective, the said one area comprising a light-transmitting component which is wedge-shaped in all radial directions relative to said optical axis, the said one area intercepting said undeviated light rays and being in said radial directions of materially greater width than the width of the light annulus image positioned thereon, said component being a dielectric material modifying the phase characteristics of the undeviated light rays being transmitted therethrough relative to the phase characteristics of the deviated light rays being transmitted through other area or areas of said plate-like means, said light aperture means providing said light annulus at said front focal plane being readily adjustable and when adjusted gradually radially varying the size of the light annulus at said front focal plane and thus the position of the undeviated light rays impinging upon said wedge-shaped component, the varying of the position of the undeviated light rays radially upon said component altering the phase characteristics of the light rays passing therethrough and traveling in overlapping relation with said deviated light rays toward the image plane of said objective, and thereby altering the contrast effect in an image of said object at the image plane of said objective.

2. A progressively variable phase contrast optical system for examining objects of relatively low contrast, said system comprising a condenser and an objective in optical alignment along a common optical axis and in predetermined spaced relation to each other, said condenser and objective jointly forming a combined lens system having a front focal plane and a rear focal plane conjugate thereto, variable light-modifying means for gradually altering in an uninterrupted progressively variable manner contrast effects in the image of an object when positioned at a predetermined object plane of said objective and illuminated by light transmitted by said condenser, said light-modifying means comprising light aperture means aligned with said combined lens system and positioned at a predetermined location forwardly of said condenser for receiving light from a light source and directing said light into said optical system, said light aperture means providing a light annulus substantially concentric with said axis and of predetermined size and contour substantially at said front focal plane, said combined lens system providing a concentric image of said light annulus at said rear focal plane, said light-modifying means also comprising parallel-sided plate-like light-transmitting means optically aligned with said combined lens system and positioned adjacent said rear focal plane, said plate-like means comprising a plurality of areas one of which is generally geometrically similar in contour to the contour of said light annulus at said front focal plane and to the image thereof at said rear focal plane, said plate-like means intercepting the deviated and undeviated light rays emanating from the object positioned at said predetermined object plane and transmitted by said objective, the said one area comprising a pair of light-transmitting components which are each wedge-shaped in all radial directions relative to said optical axis, the said one area intercepting said undeviated light rays and being in said radial directions of materially greater width than the width of the light annulus image positioned thereon, one of said components being a dielectric material modifying the phase characteristics and the other of said components being a metallic material modifying the amplitude characteristics of the undeviated light rays being transmitted therethrough relative to the phase and amplitude characteristics of the undeviated light rays being transmitted through other area or areas of said plate-like means, said light aperture means providing said light annulus at said front focal plane being readily adjustable and when adjusted gradually radially varying the size of the light annulus at said front focal plane and thus the position of the undeviated light rays impinging upon said wedge-shaped components, the varying of the position of the undeviated light rays radially upon said components altering the phase and amplitude characteristics of the light rays passing therethrough and traveling in overlapping relation with said deviated light rays toward the image plane of said objective, and thereby altering the contrast effect in an image of said object at the image plane of said objective.

3. A progressively variable phase contrast optical system for examining objects of relatively low contrast, said system comprising a condenser and an objective in optical alignment along a common optical axis and in predetermined spaced relation to each other, said condenser and objective jointly forming a combined lens system having a front focal plane and a rear focal plane conjugate thereto, variable light-modifying means for gradually altering in an uninterrupted progressively variable manner contrast effects in the image of an object when positioned at a predetermined object plane of said objective and illuminated by light transmitted by said condenser, said light-modifying means comprising light aperture means aligned with said combined lens system and positioned at a predetermined location forwardly of said condenser for receiving light from a light source and directing said light into said optical system, said light aperture means providing a light annulus substantially concentric with said axis and of predetermined size and contour substantially at said front focal plane, said combined lens system providing a concentric image of said light annulus at said rear focal plane, said light-modifying means also comprising parallel-sided plate-like light-transmitting means optically aligned with said combined lens system and positioned adjacent said rear focal plane, said plate-like means comprising a plurality of areas one of which is generally geometrically similar in contour to the contour of said light annulus at said front focal plane and to the image thereof at said rear focal plane, said plate-like means intercepting the deviated and undeviated light rays emanating from the object positioned at said predetermined object plane and transmitted by said objective, the said one area comprising a light-transmitting component which is wedge-shaped in all radial directions relative to said optical axis, the said one area intercepting said undeviated light rays and being in said radial directions of materially greater width than the width of the light annulus image positioned thereon, said component being a dielectric material modifying the phase characteristics of the undeviated light rays being transmitted therethrough relative to the phase characteristics of the deviated light rays being transmitted through other area or areas of said plate-like means, said light aperture means providing said light annulus at said front focal plane comprising composite iris diaphragm means providing a radially expansible annular aperture, said composite iris diaphragm being readily adjustable and when adjusted gradually radially varying the size of the light annulus at said front focal plane and thus the position of the undeviated light rays impinging upon said wedge-shaped component, the varying of the position of the undeviated light rays radially upon said component altering the phase characteristics of the light rays passing therethrough and traveling in overlapping relation with said deviated light rays toward the image plane of said objective, and thereby altering the contrast effect in an image of said object at the image plane of said objective.

4. A progressively variable phase contrast optical system for examining objects of relatively low contrast, said system comprising a condenser and an objective in optical alignment along a common optical axis and in predetermined spaced relation to each other, said condenser and objective jointly forming a combined lens system having a front focal plane and a rear focal plane conjugate thereto, variable light-modifying means for gradually altering in an uninterrupted progressively variable manner contrast effects in the image of an object when positioned at a predetermined object plane of said objective and illuminated by light transmitted by said condenser, said light-modifying means comprising light aperture means aligned with said combined lens system and positioned at a predetermined location forwardly of said condenser for receiving light from a light source and directing said light into said optical system, said light aperture means providing a light annulus substantially concentric with said axis and of predetermined size and contour substantially at said front focal plane, said combined lens system providing a concentric image of said light annulus at said rear focal plane, said light-modifying means also comprising parallel-sided plate-like light-transmitting means optically aligned with said combined lens system and positioned adjacent said rear focal plane, said plate-like means comprising a plurality of areas one of which is generally geometrically similar in contour to the contour of said light annulus at said front focal plane and to the image thereof at said rear focal plane, said plate-like means intercepting the deviated and undeviated light rays emanating from the object positioned at said predetermined object plane and transmitted by said objective, the said one area comprising a light-transmitting component which is wedge-shaped in all radial directions relative to said optical axis, the said one area intercepting said undeviated light rays and being in said radial directions of materially greater width than the width of the light annulus image positioned thereon, said component being a dielectric material modifying the phase characteristics of the undeviated light rays being transmitted therethrough relative to the phase characteristics of the deviated light rays being transmitted through other area or areas of said plate-like means, said light aperture means providing said light annulus at said front focal plane comprising an auxiliary condenser system forwardly of said front focal plane and diaphragm means forwardly thereof and having an annular light aperture therein, said auxiliary condenser system and said diaphragm means being readily axially adjustable and when adjusted gradually radially varying the size of the light annulus at said front focal plane and thus the position of the undeviated light rays impinging upon said wedge-shaped component, the varying of the position of the undeviated light rays radially upon said component altering the phase characteristics of the light rays passing therethrough and traveling in overlapping relation with the said deviated light rays toward the image plane of said objective, and thereby altering the contrast effect in an image of said object at the image plane of said objective.

References Cited in the file of this patent

UNITED STATES PATENTS

| Number | Name | Date |
| --- | --- | --- |
| 2,186,619 | Sauer | Jan. 9, 1940 |
| 2,206,169 | Eisenhut et al. | July 2, 1940 |
| 2,206,180 | Gerstenberger et al. | July 2, 1940 |
| 2,351,736 | Benford | June 20, 1944 |
| 2,427,689 | Osterberg et al. | Sept. 23, 1947 |

FOREIGN PATENTS

| Number | Country | Date |
| --- | --- | --- |
| 633,060 | Germany | July 18, 1936 |
| 636,168 | Germany | Oct. 7, 1936 |